United States Patent Office 3,553,265
Patented Jan. 5, 1971

3,553,265
PROCESS FOR PREPARING NITROGEN-CONTAINING TERTIARY PHOSPHINES AND PHOSPHINE OXIDES
Ludwig Maier, Tiergartenstrasse 17,
Kilchberg, Zurich, Switzerland
No Drawing. Filed July 27, 1967, Ser. No. 656,328
Claims priority, application Switzerland, Aug. 16, 1966,
11,909/66
Int. Cl. C07c 87/00, 87/06, 87/34
U.S. Cl. 260—570.5       8 Claims

ABSTRACT OF THE DISCLOSURE

Process for preparing nitrogen-containing tertiary phosphines and phosphine oxides according to the following reaction.

$$R^1R^2P-PR^1R^2 + 2R^3CH(OH)NR^4R^5 \rightarrow$$
$$R^1R^2PCH(R^3)NR^4R^5 + R^1R^2P(O)CH(R^3)NR^4R^5 + H_2O$$

The adduct of the aldehyde and amine, the second reactant above, can be made in situ by mixing an amine and an aldehyde with the biphosphine and heating, if necessary. Normally, the adduct will be made at temperatures in the range of about 0° to 40° C.; whereas, heating in the range of about 70°–150° C. will be used to make desired final products. Water and/or an alcohol will normally be used as a solvent for the reaction, and it is desirable to exclude oxygen during the reaction.

The present invention is concerned with a process for preparing nitrogen-containing tertiary phosphines and phosphine oxides of the general formula

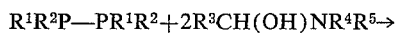

in which $R^1$ and $R^5$ signify identical or different, possibly substituted and/or ethylenically or acetylenically unsaturated hydrocarbon groups or heterocyclic groups, $R^3$, moreover, can also be a hydrogen atom, the groups $R^1$ and $R^2$ taken together with their phosphorus atom form a heterocyclic group and $NR^4R^5$ is a secondary amine group. Normally, the R groups each have not more than 24 carbon atoms and for some uses, such as biological toxicants, usually not more than 8.

The compounds having the formula above where $R^3$ is a hydrogen atom are well known. They have been obtained by condensation of a secondary phosphite or phosphine oxide with a methanolamine. However, secondary phosphines and phosphine oxides are rather scarcely available starting compounds.

Now it has been found that these compounds are also obtained when a tertiary biphosphine of the general formula $$R^1R^2P-PR^1R^2$$

wherein $R^1$ and $R^2$ are defined as before and an adduct of an aldehyde and a secondary amine of the general formula

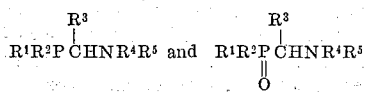

wherein $R^3$ and $NR^4R^5$ are defined as before, are heated in a solvent. The reaction of invention proceeds according to the equation $$R^1R^2P-PR^1R^2 + 2R^3CH(OH)NR^4D^5 \rightarrow$$
$$R^1R^2PCH(R^3)NR^4R^5 + R^1R^2P(O)CH(R^3)NR^4R^5 + H_2O$$

The ditertiary biphosphines serving as starting compounds are easily available by reaction of, e.g., dialkylchlorophosphines with alkali metals, or by desulfurization of biphosphine disulfides. Examples of symmetric tertiary biphosphines known from the technical literature are tetramethylbiphosphine, tetraethylbiphosphine, tetra-n-propylbiphosphine, tetra-n-butylbiphosphine, tetracyclohexylbiphosphine, tetraphenylbiphosphine, tetratrifluoromethylbiphosphine and tetrapentafluorophenylbisphosphine. Examples of well-known unsymmetric tertiary biphosphines are di - (methyl - phenyl)-biphosphine, di-(methyl-ethyl)-biphosphine and di-(methyl-butyl)-biphosphine. Other biphosphines can be prepared in similar manner.

Since the biphosphines, as a rule, are formed by desulfurization of biphosphine disulfides, which themselves are formed on reaction of $PSCl_3$ with Grignard compounds, they can show the same substituents as the Grignard compounds. Well-known Grignard compounds contain as substituents, e.g., halogen atoms, methoxy, ethoxy, n-butoxy- phenoxy, acetyl, benzoyl, acetoxy, n-propionyloxy, iso-butyryloxy, methylmercapto, phenylsulfonyl, dimethylamino, diethylamino, di-n-butylamino, N-methylanilino, trimethylsilyl, triethylsilyl or pentamethylsiloxanyl groups. These and other substituents accordingly can also be found in the end products.

The adducts of an aldehyde and a secondary amine serving as further reactant are well-known. The preparation is achieved according to the equation $$R^3CHO + HNR^4R^5 \rightarrow R^3CH(OH)NR^4R^5$$

The resulting adducts can be isolated from solution; however, also the solution obtained can be used expediently for the reaction with the biphosphine.

In the preparation of these adducts, aldehydes and secondary amines can be employed, e.g., aliphatic straight-chain or branched aldehydes such as formaldehyde, acetaldehyde, propionaldehyde, n-butyraldehyde, iso-butyraldehyde, n-valeraldehyde, iso-valeraldehyde, dimethyl-acetaldehyde, capronaldehyde, tert-butyl-acetaldehyde, enanthaldehyde, caprylaldehyde, pelargonaldehyde, caprinaldehyde, 3 - methyl - nonylaldehyde, undecylaldehyde, lauraldehyde, 3 - methyl-dodecylaldehyde, myristaldehyde, pentadecylaldehyde, palmitaldehyde, margaraldehyde, stearaldehyde, nonadecylaldehyde, arachaldehyde, tetracosanaldehyde; cycloaliphatic and hydroaromatic aldehydes such as cyclobutanaldehyde, cyclopentanaldehyde, cyclohexanaldehyde, cycloheptanaldehyde, cyclopentadecanaldehydre, decaline-2-aldehyde, hydrindene-1-aldehyde, hydrindene-5-aldehyde; moreover, araliphatic and aralicyclic aldehydes such as phenyl-acetaldehyde,
diphenyl-acetaldehyde,
1-naphthyl-acetaldehyde,
α-phenyl-propionaldehyde,
β,β,β-triphenylpropionaldehyde,
α-(1-naphthyl)-propionaldehyde,
α-(2-naphthyl)-propionaldehyde,
1-phenyl-1-formyl-cyclohexane;

moreover, aromatic and alkaromatic aldehydes such as benzaldehyde, o-, p- and m-tolylaldehyde,
3,4- and 2,4-dimethyl-benzaldehyde,
2,4,5- and 2,4,6-trimethyl-benzaldehyde,
pentamethyl-benzaldehyde,
p-iso-propyl-benzaldehyde,
p-cyclohexyl-benzaldehyde, diphenyl-2-aldehyde,
diphenyl-4-aldehyde,
indene-2-aldehyde,
hydrindene-5-aldehyde,
phenanthrene-1-aldehyde,
phenanthrene-2-aldehyde,
phenanthrene-3-aldehyde,
phenanthrene-9-aldehyde,
pyrene-3-aldehyde,
naphthalene-1-aldehyde,
naphthalene-2-aldehyde,
anthracene-9-aldehyde,
chrysene-5-aldehyde;

heterocyclic and heterocyclicaliphatic aldehydes like pyrazole-3-aldehyde,
thiazole-5-aldehyde,
benzthiazole-2-aldehyde,
pyrrole-2-aldehyde,
2,3,4-trimethyl-pyrrole-5-aldehyde,
thiophene-2-aldehyde,
thiophene-3-aldehyde,
2-formylmethylene-3,4-dimethyl-thiazoline,
1-phenyl-3-methyl-5-pyrazolone-4-aldehyde,
1,2,3-triazole-4-aldehyde,
furfurole, tetrahydrofurfurole,
1-methyl-imidazole-5-aldehyde,
pyridine-2-aldehyde,
pyridine-3-aldehyde,
pyridine-4-aldehyde,
tetrahydropyridine-3-aldehyde,
tetrahydropyrane-3-aldehyde,
indole-2-aldehyde,
indole-3-aldehyde,
2-methyl-indole-3-aldehyde,
quinoline-2-aldehyde,
quinoline-4-aldehyde,
quinoline-8-aldehyde,
quinoxaline-2-aldehyde,
iso-quinoline-1-aldehyde,
iso-quinoline-3-aldehyde,
cumarin-3-aldehyde,
cumarin-4-aldehyde,
thionaphthene-2-aldehyde,
thionaphthene-3-aldehyde,
benzo-1,4-dithiadiene-2-aldehyde,
phenazine-1-aldehyde,
piperonal.

The aldehyde group can be attached also via a hydrocarbyl group to a heterocyclic ring system like in the compounds furyl-acetaldehyde, 3-indolylacetaldehyde, instead of being attached directly.

Moreover, the aldehydes can contain an olefinic unsaturation like in acrolein, α-methyl-acrolein, crotonaldehyde, dimethyl-vinylacetaldehyde, tiglaldehyde, penten-(2) - al-(1), penten-(4)-al-(1), β-vinyl-propionaldehyde, octen-(2)-al-(1), octen-(6)-al-(1)- citronellal, cyclopentene - (1)-aldehyde, cyclohexene-(1)-aldehyde, cyclohexene-(2)-aldehyde, cyclohexene-(3)-aldehyde, cyclohexenyl-(1)-acetaldehyde, cyclohexylidene-acetaldehyde, tetralin-1-aldehyde, β,β-diphenyl-acrolein, α-phenyl-crotonaldehyde, 4-phenyl-buten-(3)-al-(1), 3- and 4-vinyl-benzaldehyde, benzylidene-acetaldehyde, β-(2-furyl)-acrolein.

Moreover, the aldehydes can contain two or more double bonds like butadiene - 1 - aldehyde, hexadienal, α-vinyl-crotonaldehyde, β - vinyl-crotonaldehyde, 2 - methyl-cyclohexadiene-(1,4)-aldehyde, 4 - cyclohexenyl-(1)-2-methyl-buten - (2) - al - (1), 5 - phenylpentadien-(2,4)-al-(1), octatrienal, 7-phenyl-heptatrienal-(1), 9-phenyl-nonatetraen - (2,4,6,8)-al-(1), 13 - phenyl-tridecahexaen-(2,4,6,8,10,12)-al-(1).

Moreover the aldehydes can show one or more acetylenic bonds like propargylaldehyde butin-(3)-al-(1)-butin-(2)-al-(1), pentin-(3)-al-(1), hexin-(3)-al-(1), tert-butyl-acetylenaldehyde, nonin-(2)-al-(1), undecin-(10)-al-(1)-phenyl-propargylaldehyde, 6,6 - dimethyl-heptadiin-(2,4)-al-(1).

It is understood that the aldehydes may show simultaneously ethylenic and acetylenic bonds. These aldehydes can possess one or more substituents, such as Cl, Br, I, F, —OH, —OR, —SH, —SR, —COOH, —COOR
—$CONH_2$, —CONHR, —$CONR_2$, —NHCOOR
—NRCOOR, —NHCOR, —NRCOR, —SOR, —$SO_2R$
—$SO_2NH_2$, $SO_2NHR$, —$SO_2NR_2$, —$NHSO_2R$
—$NRSO_2R$, —$SO_2OH$, —$SO_2OR$, —OCOR, —$NH_2$
—NHR, —$NR_2$, —$NO_2$, —CN and —$N_3$. (R is defined on principle similarly to $R^1$). Analogous substituents possessing sulfur atoms instead of oxygen atoms attached to the carbon atoms are also included.

Some simple representatives of halogenated aldehydes which can be used for the preparation of the adducts are:

chloro-acetaldehyde,
dichloro-acetaldehyde,
trichloro-acetaldehyde,
α-chloro-acrolein,
β-chloro-acrolein,
α,β-dichloroacrolein,
β,β-dichloroacrolein,
α-chloro-cinnamaldehyde,
β-chloro-cinnamaldehyde,
α-(4-chlorophenyl)-cinnamaldehyde,
1-chloro-cyclohexane-1-aldehyde,
chloro-benzaldehydes,
dichloro-benzaldehydes,
trichlorobenzaldehydes,
2,6-dichloro-pyridine-4-aldehyde,
4,6-dichloropyridine-2-aldehyde, and the corresponding analogues which contain bromine, iodine, fluorine or mixtures of halogen atoms. Further halogenated aldehydes, as well as further substituted aldehydes, such as mentioned below, are derived from the aldehydes enumerated above as examples.

The halogen atoms can be found also in one of the organic substituents enumerated above as in the compounds, e.g. β-chloroethoxy-acetaldehyde, 2,4 - dichlorophenoxy-acetaldehyde, pentachlorophenoxy-acetaldehyde, 4 - β-bromoethoxy-benzaldehyde, N-β-chloroethyl-N-methyl-4-amino-benzaldehyde, 5 - (4' - chlorophenylamino)-pentadienal.

Some simple representatives of aldehydes showing hydroxyl groups are glycolaldehyde, glyceraldehyde, trimethylol-acetaldehyde, 2 - hydroxyphenyl-acetaldehyde, 2-, 3- and 4 - hydroxy-benzaldehyde, dihydroxy-benzaldehydes, trihydroxy-bmenzaldehydes, 5-hydroxy-furfurole, 4 - hydroxyquinoline-aldehyde, N-hydroxyethyl-N-butyl-amino-benzaldehyde, β - hydroxyethylmercapto-acetaldehyde.

The corresponding sulfur analogues which contain SH groups instead of OH groups like mercapto-acetaldehyde, mercaptobenzaldehyes, etc., are also included Some simple representatives of aldehydes showing ether groups are methoxy-acetaldehyde, methoxy-benzaldehydes, dimethoxy-benzaldehyes, trimethoxy-benzaldehydes and the corresponding analogues which contain ethoxy, n-propoxy, iso-propoxy, n-butoxy, iso-butoxy, sec-butoxy, tert-butoxy groups and higher alkoxy groups, cyclobutyloxy groups and cycloalkoxy groups with greater rings having up to 12 carbon atoms, benzyloxy groups and higher aralkoxy groups, phenoxy groups and higher aroxy groups and heterocycloalkoxy groups. There are also included the corresponding ether groups which are ethylenically or acetylenically unsaturated like allyloxy, proparglyloxy, cinnamyloxy groups and corresponding groups having several unsaturations.

The corresponding sulfur analogues like methylmercapto - acetaldehyde, methylmercapto-benzaldehyde, etc. are also included.

Some simple representatives of aldehydes showing carboxyl groups are glucuronic acid,
3-phenyl-3-carboxy-propionaldehyde,
phenyl-acetaldehyde-2-carboxylic acid,
benzaldehyde-carboxylic acids,
2,3-dimethoxy-6-carboxy-benzaldehyde,
4-hydroxy-3-carboxy-benzaldehyde,
furfurole-5-carboxylic acid,
pyrazole-3-aldehyde-5-carboxylic acid.

The corresponding thiocarboxylic acids like β-benzoyl-mercapto-acrolein, β-acetylmercapto-propion-aldehyde are also included.

The carboxylic groups can be also esterified like in the compounds, e.g., 3-carbethoxy-n-propionaldehyde, 4,4-dicarbethoxy-n-butyraldehyde, 2-, 3- and 4-carbethoxy-benzaldehyde, 6-carbethoxy-pyridine-2-aldehyde, etc. These esters can be derived, instead of from ethyl alcohol, also from other alcohols like methyl alcohol, n-propyl alcohol, iso-propyl alcohol, n-butyl alcohol, iso-butyl alcohol, sec-butyl alcohol, tert-butyl alcohol and higher aliphatic alcohols having up to 24 carbon atoms, cyclobutyl alcohol and cycloaliphatic alcohols having greater rings with up to 12 carbon atoms, benzyl alcohol and higher araliphatic alcohols, phenol, cresols, xylenols and higher aromatic and alkaromatic alcohols, α-furfuryl alcohol, α-hydroxyquinoline and other heterocyclic alcohols. The alcohol constituent of the ester group can be derived also from an unsaturated alcohol like allyl alcohol, propargyl alcohol, cinnamyl alcohol, allyl phenols, etc. There are also comprised the groups of multihydric alcohols and phenols, such as glycol, glycerin, hydroquinone, resorcin, pholoroglucin and the like.

The carboxylic groups can also be aminated in known manner with ammonia, primary amines or secondary amines, instead of being esterified.

The enumerated carboxylic ester groups can also be attached via a secondary or tertiary nitrogen atom to the aldehyde. These are then urethane groups like, e.g., in the compound carbethoxyamino-acetaldehyde.

The amide groups, however, can also be linked via their nitrogen atom to the aldehyde, instead of being linked via the carbon atom of the carboxylic group. Some simple representatives of aldehydes showing acylamino groups are 4-acetylamino-valeraldehyde, acetylamino-cinnamaldehyde, 2- and 3-acetylamino-benzaldehyde and 5-acetylaminothiophene-2-aldehyde. The groups of other carboxylic acids such as formic acid, n-propionic acid, iso-propionic acid, n-butyric acid, iso-butyric acid and higher aliphatic acids having up to 24 carbon atoms like stearic acid, arachic acid are also included; moreover, cyclobutane carboxylic acid and cycloaliphatic carboxylic acids with greater rings having up to 12 carbon atoms like cyclooctane carboxylic acid, cyclododecane carboxylic acid; phenylacetic acid and higher araliphatic carboxylic acids, benzoic acid, methylbenzoic acid and higher aromatic carboxylic acids and alkaromatic carboxylic acids, furan-α-carboxylic acid, pyrrole-α-carboxylic acid, pyridine carboxylic acid and other heterocyclic carboxylic acids, can take the place of the acetic acid group.

There are also included the groups of unsaturated acids such as crotonic acid, sorbic acid, propiolic acid, tetrolic acid, tetrahydrobenzoic acid, cinnamic acid, phenylpropiolic acid, allylbenzoic acid, propargylbenzoic acid, propynylbenzoic acid, etc. Further comprised are the groups of dicarboxylic acids like, e.g., oxalic acid, malonic acid, succinic acid, maleic acid, fumaric acid, adipic acid, phthalic acid and the like.

Some simple representatives of aldehydes showing sulfinyl groups, sulfonyl groups, sulfamido groups, sulfonic acid groups and sulfonic ester groups are methylsulfoxy-benzaldehyde,
methylsulfonyl-benzaldehyde,
acetaldehyde-di-sulfodimethylamide,
benzaldehyde-p-sulfamide,
N-ethyl-N-sulfobenzyl-4-aminobenzaldehyde,
chloro-acetaldehyde-sulfonic acid,
phenyl-acetaldehyde-2-sulfonic acid,
benzaldehyde-sulfonic acids,
4-nitrobenzaldehyde-2-sulfonic acid,
chloroacetaldehyde-disulfonic dimethylester.

Additional amido groups and ester groups are formed in similar manner as with the carboxylic acids.

The amino groups arising in the aldehyde as substituents have preferably tertiary character. Some simple representatives are dimethylaminomethyl-hydroxymethyl-chloro-acetaldehyde,
4-dimethylamino-butyraldehyde,
α-dimethylaminomethyl-n-butyraldehyde,
α,α-bis-(dimethylaminomethyl)-n-butyraldehyde,
methylaminobenzaldehydes,
dimethylamino-benzaldehydes,
2,4- and 2,5-bis-(dimethylamino)-benzaldehyde,
piperidino-acetaldehyde,
cytosin-4-aldehyde.

Other hydrocarbyl groups or heterocyclic groups, such as have been enumerated above for $R^1$ and $R^2$ can be found on the nitrogen atom instead of the methyl group or piperidino group.

Some simple representatives of aldehydes having nitro groups are nitro-acetaldehyde, 4-nitro-butyraldehyde, 4,4-dicarbethoxy-4-nitro-butyraldehyde, 2 - nitrophenyl-acetaldehyde, m-nitro-α-methyl-cinnamaldehyde, 2-, 3- and 4-nitro-benzaldehyde, 2,6- and 3,4-dinitro-benzaldehyde, 5-nitro-2-chloro-benzaldehyde, 4-nitrodiphenylether-2-aldehyde, nitrothiophene-2-aldehyde, 8-nitroquinoline-4-aldehyde.

Some simple representatives of aldehyde having cyano groups or azido groups are cyano-acetaldehyde, 3-cyano-propionaldehyde, 4-cyano-butyraldehyde, 3- and 4-cyano-benzaldehyde, β-azido-propionaldehyde, 2- and 4-azido-benzaldehyde.

From the compilation of examples of substituted aldehydes set forth above it is apparent that the aldehydes can show also a combination of various substituents.

Any secondary amine which can be reacted with an aldehyde according to the scheme set forth above to give the corresponding methylolamine compound, which can be substituted in the methylene group, will be suitable. It is understood that also heterocyclic amines such as pyrrolidine, ethylenimine, 1,3-propylenimine, 1,2-propylenimine, pyrazoline, N-methylpyrazolidine, imidazoline, N - ethylimidazoline, piperidine, N - trimethylsilylpiperazine, morpholine, thiazine, indole and the like can also be used as secondary amines. In such cases the group $NR_2$ forms a heterocyclic ring system which can contain further heteroatoms like O, N, S, etc., as well as substituents.

Instead of an aldehyde and a secondary amine, there can be used also aminoaldehydes in the form of intramolecularly built cyclic aminocarbinols. In such instances the desired phosphines and phosphine oxides will contain, besides the organic groups, $R^1$ and $R^2$, a 2-pyrrolinyl group, 2-piperidyl group, 3-morpholinyl group, 2-thiazinyl group, etc.

The substituents enumerated for the aldehydes can occur also in the secondary amines to the extent that these amines then will not react as a H-acid reactant like, e.g., pyrrole, tetrazole, hydroxymic acids, amides of organic and inorganic acids, also pyrrolidone, N-arylhydroxylamines, etc.

The amines in a questionable region owing to their weak basicity like, e.g., diphenylamine, carbazole, pyrroline, pyrazole, triazole, imidazole, azimidobenzene and the like have to be tested for their usefulness in a preliminary experiment. The kind of the aldehyde also plays a role. Also, unsuited are di-iso-propylamine and di-tert-butylamine, whereas, 2,2,6,6-tetra-methylpiperidine is fit for the reaction in spite of the branchings in the neighborhood of the N-atoms.

In carrying out the process, the methylolamine which can be substituted in its methylene group is first prepared by combining an aldehyde and a secondary amine in a molar ratio of 1:1 in a solvent. It is formed usually at temperatures between 0 and 40° C. The reaction mixture can also be heated at higher temperatures, if necessary. This intermediate is, preferably without isolation, converted into the end product by heating with a biphosphine in a molar ratio about 2:1. If it is possible, the intermediary product can also be isolated and purified. A further possibility to carry out the reaction is to react all three reactants simultaneously. The amino reactant sometimes can be used expediently in excess.

Suitable solvents are especially water, alcohols and their mixtures. Other hydrophilic solvents such as acetonitrile, dimethylacetamide, dimethylsulfone, dimethylsulfoxide, tetrahydrofurane, pyridine, etc., are also suitable.

The reaction is expediently carried out with exclusion of oxygen in order to protect the tertiary phosphine against oxidation. The resulting phosphines, however, also can be oxidized by adding oxygen or air.

The end products can separate from the reaction medium after being formed. This is especially the case if they contain aromatic groups or long-chain aliphatic groups. The separation will be promoted by addition of water. Otherwise, the solution can be evaporated under reduced pressure. The purification can be achieved by recrystallization or reprecipitation and sometimes also by distillation.

The nitrogen-containing tertiary phosphines and phosphine oxides obtained according to the novel process are useful as complexing agents, surface-active agents, additives to detergents, oils and lubricants; they can also display biocidal activities, especially if they show halogen atoms and/or nitro groups on an aromatic substituent. Moreover, they are valuable intermediates for the preparation of other phosphorus compounds in that the $R^4R^5N$ group, shown in the formula set forth at the beginning, is replaceable for corresponding phosphinyl groups.

EXAMPLE 1

To 37.0 g. (0.1 mol) of tetraphenylbiphosphine in 300 ml. of alcohol there are added dropwise 6 g. (0.2 mol) of formaldehyde (37% aqueous solution) and 14.6 g. (0.2 mol) of diethylamine. Then, the mixture is refluxed for 2½ hours. A clear solution results which is evaporated under reduced pressure. The residue is distilled. Yield 25 g. (92%) of $(C_6H_5)_2PCH_2N(C_2H_5)_2$; $KP_{0.2-0.3}$ 130–133° C. $n_D^{20}$ 1.5912; $P^{31}$ chem. shift+27.8 p.p.m.

*Analysis.*—Calc'd for $C_{17}H_{22}NP$ (271.38) (percent): C, 75.24; H, 8.17; N, 5.16. Found (percent): C, 74.93; H, 8.27; N, 5.15.

From the residue of the distillation are obtained by extracting with hexane 24.8 g. (86.5%) of $(C_6H_5)_2P(O)CH_2N(C_2H_5)_2$ M.P. 86–89° (from hexane); $P^{31}$ chemical shift (acetone) —24.7 p.p.m.

*Analysis.*—Calc'd for $C_{17}H_{22}NOP$ (287.33) (percent): C, 71.05; H, 7.71; N, 4.87. Found (percent): C, 70.74; H, 8.19; N, 4.93.

EXAMPLE 2

To 2.9 g. (0.01 mol) of tetra-n-butylbiphosphine there are added dropwise $(C_2H_5)_2NCH_2OH$ which has been prepared from 0.60 g. (0.02 mol) of formaldehyde (37% aqueous solution) and 1.52 g. (0.02 mol) of diethylamine in 5 ml. of alcohol. The reaction product is extracted with benzene, dried and fractionally distilled. Yield 2.1 g. (91%) of $(n-C_4H_9)_2PCH_2N(C_2H_5)_2$; $B.P._{0.1}$ 70–72° C.; $n_D^{25}$ 1.4670 and as sublimate 2.3 g. (93%) of

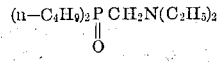

M.P. 94–98° C.

What is claimed is:

1. A process for preparing nitrogen-containing tertiary phosphines and phosphine oxides of the formula

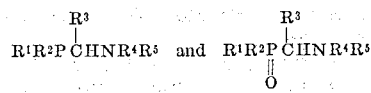

in which $R^1$, $R^2$, $R^4$ and $R^5$ are identical or different alkyl or aryl groups of not more than 8 carbon atoms, $R^3$ is hydrogen or $R^1$ comprising reacting at a temperature of from 70° to 150° C. in an inert solvent a tertiary biphosphine of the formula $R^1R^2P\!-\!PR^1R^2$ in which $R^1$ and $R^2$ are defined as above, with an adduct of an aldehyde and a secondary amine of the formula

in which $R^3$, $R^4$ and $R^5$ are defined as above.

2. A process of claim 1 wherein $R^3$ is a hydrogen atom.

3. A process of claim 1 wherein first an aldehyde and a secondary amine are reacted at a temperature of 0 to 40° C. and the resulting intermediate product is heated at 70 to 150° C. with a tertiary biphosphine.

4. A process of claim 1 wherein the solvent is water, an alcohol or a mixture of both.

5. A process of claim 1 wherein the reaction is carried out excluding oxygen.

6. A process of claim 1 wherein an aldehyde, a secondary amine and a tertiary biphosphine are reacted.

7. A process for preparing a tertiary phosphine $(C_6H_5)_2PCH_2N(C_2H_2)_2$ and a phosphine oxide

which comprises reacting at a temperature of from 70° to 150° C. formaldehyde, diethylamine and tetraphenylbiphosphine, in an inert solvent.

8. A process for preparing a tertiary phosphine $(n-C_4H_9)_2PCH_2N(C_2H_5)_2$ and a phosphine oxide

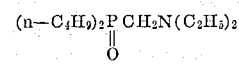

which comprises reacting at a temperature of from 70° to 150° C. tetra-n-butylbiphosphine, in an inert solvent with an adduct of formaldehyde and diethylamine.

References Cited

UNITED STATES PATENTS 3,037,978  6/1962  Coates et al. _____ 260—583X

OTHER REFERENCES

Davidson et al.: J. Chem. Soc. (London), volume of 1966 ©, pp. 722 to 724.

FLOYD D. HIGEL, Primary Examiner

U.S. Cl. X.R.

44—1, 72, 74; 208—19; 252—49.9, 152, 357; 260—267, 288, 296, 304, 306.7, 306.8, 308, 310, 329, 326.15, 326.85, 327, 345.2, 347.7, 429, 448.2, 448.8, 563, 570.6, 576, 577, 578, 583, 584, 999